(12) United States Patent
Al-Dhubhani et al.

(10) Patent No.: US 12,330,124 B2
(45) Date of Patent: Jun. 17, 2025

(54) METHOD FOR ASSEMBLING A BIPOLAR MEMBRANE, BIPOLAR MEMBRANE, AND USE OF SAID BIPOLAR MEMBRANE

(71) Applicant: W & F TECHNOLOGIES B.V., Zevenbergen (NL)

(72) Inventors: Emad Mohammed Noman Al-Dhubhani, Leeuwarden (NL); Machiel Saakes, Leeuwarden (NL); Michele Alessandro Tedesco, Leeuwarden (NL)

( * ) Notice: Subject to any disclaimer, the term of this patent is extended or adjusted under 35 U.S.C. 154(b) by 0 days.

(21) Appl. No.: 18/728,831

(22) PCT Filed: Jan. 9, 2023

(86) PCT No.: PCT/NL2023/050006
§ 371 (c)(1),
(2) Date: Jul. 12, 2024

(87) PCT Pub. No.: WO2023/136718
PCT Pub. Date: Jul. 20, 2023

(65) Prior Publication Data
US 2025/0091019 A1     Mar. 20, 2025

(30) Foreign Application Priority Data
Jan. 12, 2022   (NL) ..................... 2030514

(51) Int. Cl.
*B01D 69/14*     (2006.01)
*B01D 67/00*     (2006.01)
*B01D 69/12*     (2006.01)

(52) U.S. Cl.
CPC ..... *B01D 69/145* (2013.01); *B01D 67/00793* (2022.08); *B01D 69/1216* (2022.08);
(Continued)

(58) Field of Classification Search
None
See application file for complete search history.

(56) References Cited

U.S. PATENT DOCUMENTS

2006/0173084 A1   8/2006 Zheng et al.
2013/0317128 A1*  11/2013 Lin ...................... B01D 69/107
                                                      252/182.17
(Continued)

FOREIGN PATENT DOCUMENTS

DE      10 2009 013207 A1   9/2010
WO      2017/205458 A1      11/2017

*Primary Examiner* — Dung H Bui
(74) *Attorney, Agent, or Firm* — Derek Fahey, Esq.; The Plus IP Firm, PLLC (57) ABSTRACT

The invention relates to a method for assembling a bipolar membrane, and bipolar membrane thereof. The method comprises the steps of electrospinning and centrifugal spinning and electrocentrifugal spinning a first cation exchange layer comprising a first water splitting catalyst and a first cation exchange polymer, electrospinning and centrifugal spinning and electrocentrifugal spinning a junction layer. Further, the method comprises electrospinning and centrifugal spinning and electrocentrifugal spinning a first anion exchange layer comprising a second water splitting catalyst and a first anion exchange polymer. A system comprising a bipolar membrane according to the invention is also disclosed.

17 Claims, 4 Drawing Sheets

(52) U.S. Cl.
CPC .... *B01D 2323/081* (2022.08); *B01D 2323/39* (2013.01); *B01D 2325/10* (2013.01); *B01D 2325/12* (2013.01); *B01D 2325/14* (2013.01); *B01D 2325/42* (2013.01)

(56) References Cited

U.S. PATENT DOCUMENTS

| | | | |
|---|---|---|---|
| 2019/0134570 A1* | 5/2019 | Pintauro | B01D 69/1216 |
| 2020/0370188 A1 | 11/2020 | Sebastian et al. | |
| 2021/0207275 A1* | 7/2021 | Huo | C25B 3/26 |

* cited by examiner

METHOD FOR ASSEMBLING A BIPOLAR MEMBRANE, BIPOLAR MEMBRANE, AND USE OF SAID BIPOLAR MEMBRANE

CROSS-REFERENCE TO RELATED APPLICATIONS

This application is a national stage application, filed under 35. U.S.C. § 371, of International Patent Application No. PCT/NL2023/050006, filed on Jan. 9, 2023 which is incorporated by reference herein its entirety, and which claims priority to NL2030514, filed Jan. 12, 2022.

The present invention relates to a method for assembling a bipolar membrane, a bipolar membrane, and use of said bipolar membrane. Furthermore, the invention relates to a bipolar membrane obtainable by the method for assembling a bipolar membrane according to the invention.

A bipolar membranes may have several layers, such as a cationic exchange layer, a mixed anion and cation exchange layer, and an anionic exchange layer. In a conventional bipolar membrane, a cation exchange layer and an anion exchange layer are joined together via hot pressing or via casting or via extrusion, for example. Heterogeneous bipolar membranes are made by joining an anion exchange layer composed of anion exchange resin particles in a supporting inert polymer and of a cation exchange layer composed of cation exchange resin particles in a supporting inert polymer. The supporting polymer may be made of polyethylene or polypropylene or poly ether ether ketone, for example. Homogeneous bipolar membranes are made by joining an anion exchange layer made of a polymer with positively charged groups like tertiary and quaternary ammonium groups and a cation exchange layer made of a polymer with negatively charged groups like carboxylate and sulfonate groups. Conventional manufacturing of bipolar membranes is done by connecting said anion exchange layers and cation exchange layers by casting and/or physically attaching anion exchange layers and cation exchange layers with a water splitting 2D interface between the anion exchange layer and the cation exchange layer. At the 2D interface, a water splitting catalyst may be applied by casting or spraying for example.

A problem of conventional 2D interface bipolar membranes and/or methods for manufacturing such bipolar membranes is delamination, also referred to as ballooning, which can occur at the junction of the interface between the anion exchange layers and cation exchange layer due to (osmotic) pressure build-up during start-ups and shut-downs of electrodialysis systems, for example. This problem is even bigger when the size of the bipolar membrane expands and when said membranes are made in a batch-wise process.

An objective of the present invention is to provide a method for assembling a bipolar membrane that obviates or at least reduces one or more of the aforementioned problems and/or is more effective as compared to conventional methods and systems.

This objective is achieved with the method for assembling a bipolar membrane, wherein the method comprises the steps of:
electrospinning and/or centrifugal spinning and/or electrocentrifugal spinning a first cation exchange layer comprising a first water splitting catalyst and a first cation exchange polymer;
electrospinning and/or centrifugal spinning and/or electrocentrifugal spinning a junction layer; and
electrospinning and/or centrifugal spinning and/or electrocentrifugal spinning a first anion exchange layer comprising a second water splitting catalyst and a first anion exchange polymer.

The method according to the invention may either start with electrospinning and/or centrifugal spinning and/or electrocentrifugal spinning a first cation exchange layer, electrospinning and/or centrifugal spinning and/or electrocentrifugal spinning a junction layer, or electrospinning and/or centrifugal spinning and/or electrocentrifugal spinning a first anion exchange layer. Depending on the layer which is assembled first, the adjacent layers may be assembled following the first assembled layer. For example, the method according to the invention may start with the step of electrospinning and/or centrifugal spinning and/or electrocentrifugal spinning a junction layer. Said step may be followed by the step of electrospinning and/or centrifugal spinning and/or electrocentrifugal spinning a first cation exchange layer comprising a first water splitting catalyst and a first cation exchange polymer. Thus, the first cation exchange layer occupies one side of the junction layer. Said step may then be followed by the step of electrospinning and/or centrifugal spinning and/or electrocentrifugal spinning a first anion exchange layer comprising a second water splitting catalyst and a first anion exchange polymer. The first anion exchange layer is assembled adjacent to the unoccupied surface of the junction layer. Alternatively, the step of electrospinning and/or centrifugal spinning and/or electrocentrifugal spinning a junction layer is followed by first electrospinning and/or centrifugal spinning and/or electrocentrifugal spinning a first anion exchange layer and then electrospinning and/or centrifugal spinning and/or electrocentrifugal spinning a first cation exchange layer.

Alternatively, the method according to the invention may start with the step of electrospinning and/or centrifugal spinning and/or electrocentrifugal spinning a first cation exchange layer comprising a first water splitting catalyst and a first cation exchange polymer. Preferably, the first cation exchange layer is assembled adjacent to or on a carrier, wherein the carrier may be inert to the first cation exchange layer. Preferably, the carrier is an electrically conductive carrier layer.

Therefore, in a preferred embodiment, the method according to the invention comprises the step of providing a carrier. A carrier which is preferably inert to any (cation exchange layer, anion exchange layer, and junction layer) of the layers enables to remove the bipolar membrane easily and reduces damaging of the bipolar membrane. Preferably, the carrier is an electrically conductive carrier layer.

The step of electrospinning and/or centrifugal spinning and/or electrocentrifugal spinning a first cation exchange layer may be followed by the step of electrospinning and/or centrifugal spinning and/or electrocentrifugal spinning a junction layer, wherein the junction layer is assembled adjacent to (the unoccupied surface) of the first cation exchange layer. Furthermore, the step of electrospinning and/or centrifugal spinning and/or electrocentrifugal spinning a junction layer may be followed by the step of electrospinning and/or centrifugal spinning and/or electrocentrifugal spinning a first anion exchange layer comprising a second water spitting catalyst and a first anion exchange polymer. The first anion exchange layer is assembled adjacent to the junction layer.

In another alternative embodiment, the method according to the invention may start with the step of electrospinning and/or centrifugal spinning and/or electrocentrifugal spinning a first anion exchange layer comprising a second water splitting catalyst and a first anion exchange polymer. Preferably, the first anion exchange layer is assembled adjacent to or on a carrier, wherein the carrier may be inert to the first anion exchange layer. Preferably, the carrier is an electrically conductive carrier layer.

The step of electrospinning and/or centrifugal spinning and/or electrocentrifugal spinning a first anion exchange layer may be followed by the step of electrospinning and/or centrifugal spinning and/or electrocentrifugal spinning a junction layer, wherein the junction layer is assembled adjacent to (the unoccupied surface) of the first anion exchange layer. Furthermore, the step of electrospinning and/or centrifugal spinning and/or electrocentrifugal spinning a junction layer may be followed by the step of electrospinning and/or centrifugal spinning and/or electrocentrifugal spinning a first cation exchange layer comprising a first water splitting catalyst and a first cation exchange polymer. The first cation exchange layer is assembled adjacent to the junction layer.

In other words, the different layers (cation exchange layer, junction layer, anion exchange layer) may be assembled in any desired order, wherein the junction layer comprises an adjacent cation exchange layer and an adjacent anion exchange layer on the other side of the junction layer. Thus, a cation exchange layer and an anion exchange layer are provided on opposite sides of the junction layer.

It is noted that assembling the different layers includes operatively coupling the layers (cation exchange layer, junction layer, anion exchange layer). Operatively coupling refers to an interaction between the layers, such that cations such as protons and/or anions such as hydroxyl ions and/or electrons may be transported from one side of the bipolar membrane to the other side of the membrane.

It was found that the first cation exchange layer, junction layer, and first anion exchange layer may be assembled by multiple electrospinning and/or centrifugal spinning and/or electrocentrifugal spinning. Multiple electrospinning and/or centrifugal spinning and/or electrocentrifugal spinning enables to include different compounds in a single layer. Furthermore, multiple electrospinning and/or centrifugal spinning and/or electrocentrifugal spinning enables to include compounds with different solubility and/or compounds which are soluble in immiscible solvents in a single layer. It is noted that multiple electrospinning and/or centrifugal spinning and/or electrocentrifugal spinning is not limited to the first cation exchange layer, junction layer, and first anion exchange layer.

In a preferred embodiment, the steps of electrospinning and/or centrifugal spinning and/or electrocentrifugal spinning comprise electrospinning and/or centrifugal spinning and/or electrocentrifugal spinning with two spinnerets, three, or four spinnerets, preferably comprise electrospinning and/or centrifugal spinning and/or electrocentrifugal spinning with two spinnerets.

Multiple electrospinning and/or centrifugal spinning and/or electrocentrifugal spinning comprises electrospinning and/or centrifugal spinning and/or electrocentrifugal spinning with multiple spinnerets. For example, dual electrospinning and/or centrifugal spinning and/or electrocentrifugal spinning comprises electrospinning and/or centrifugal spinning and/or electrocentrifugal spinning with two spinnerets and triple electrospinning and/or centrifugal spinning and/or electrocentrifugal spinning comprises electrospinning and/or centrifugal spinning and/or electrocentrifugal spinning with three spinnerets. Thus, dual electrospinning and/or centrifugal spinning and/or electrocentrifugal spinning enables assembling of a single layer comprising a compound which is soluble/dispersible in an aqueous solvent/dispersant and a compound which is soluble/dispersible in a non-aqueous solvent/dispersant and/or organic solvent/dispersant. It is noted that one spinneret provides the compound which is soluble/dispersible in an aqueous solvent/dispersant and the other spinneret provides the compound which is soluble/dispersible in a non-aqueous solvent/dispersant and/or organic solvent/dispersant.

A further advantage of multiple electrospinning and/or centrifugal spinning and/or electrocentrifugal spinning is the method according uses a versatile method of introducing nanomaterials into polymeric nanofibrous structures in a controlled and/or homogeneous manner by enabling the simultaneous use of aqueous solutions and/or dispersions and organic solvent/dispersant based polymeric dispersions and/or solutions by means of multiple, such as dual, electrospinning and/or centrifugal spinning and/or electrocentrifugal spinning.

Furthermore, the method according to the invention provides a versatile method of including compounds, such as nanomaterials, into a polymeric nanofibrous structure in a controlled and/or homogeneous manner by enabling the simultaneous use of aqueous solvents/dispersants and/or organic solvents comprising a polymeric solution.

For example, assembling the first cation exchange layer by dual electrospinning and/or centrifugal spinning and/or electrocentrifugal spinning enables to provide a first water splitting catalyst and a first cation exchange polymer separately to the first cation exchange layer. As a result, the aqueous soluble/dispersible first water splitting catalyst and the non-aqueous soluble/dispersible first cation exchange polymer may be included in the first cation exchange layer.

It is noted that this approach is also applicable for further cation exchange layers, the anion exchange layers, and junction layer.

Electrospinning and/or centrifugal spinning and/or electrocentrifugal spinning the different layers enables to achieve a bipolar membrane which has evenly coupled layers and that the layers are compact. In other words, the layers are directly assembled to adjacent layers and/or adhering of two adjacent layers is evenly distributed. An advantage thereof is that delamination of the assembled bipolar membrane is reduced compared to conventional methods for assembling a bipolar membrane. As a result, the method according to the invention provides a bipolar membrane which is less prone to delamination. Therefore, a more efficient and effective method for assembling a bipolar membrane is achieved.

Another advantage of the method according to the invention is that evenly coupled layers of the bipolar membrane provide a bipolar membrane which is highly chemically resistant and/or mechanically stable. In fact, said bipolar membrane is more chemically resistant and/or mechanically stable compared to conventional bipolar membranes. Therefore, the method according to the invention enables efficient and effective assembling of a bipolar membrane.

In fact, the method according to the invention enables a bipolar membrane without coupling surfaces between the different layers, due to constantly providing the compounds to assemble the different layers.

Assembling a (multi-layer) bipolar membrane by use of multiple, such as dual, electrospinning and/or centrifugal spinning and/or electrocentrifugal spinning enables the simultaneous use of aqueous solutions and/or dispersion with inorganic catalysts and/or organic catalysts in an organic phase and the single multiple, such as dual, electrospinning and/or centrifugal spinning and/or electrocentrifugal spinning of one or more (preferably two) different polymeric solutions and/or dispersions in an organic phase.

Furthermore, the assembling of a (multi-layer) bipolar membrane by use of multiple, such as dual, electrospinning and/or centrifugal spinning and/or electrocentrifugal spinning enables the simultaneous use of aqueous solutions and/or dispersions with inorganic catalysts and/or organic catalysts in an organic phase and the single multiple, such as dual, electrospinning and/or centrifugal spinning and/or electrocentrifugal spinning of one or more (preferably two) different polymeric solutions and/or dispersions in an organic phase with the use of nanometer sized silica, preferably 2 to 4 nanometer sized silica, as inorganic catalyst for water splitting in $H^+$ and OH and poly(4-vinylphenol) as organic catalyst for water splitting in $H^+$ and OH.

In a preferred embodiment, the electrospinning and/or centrifugal spinning and/or electrocentrifugal spinning of a cation exchange layer, a junction, and/or an anion exchange layer is electrospinning the cation exchange layer, the junction, and/or the anion exchange layer.

It was found that electrospinning the cation exchange layer, the junction, and/or the anion exchange layer provides the layers in an efficient and effective manner.

In a preferred embodiment according to the invention, the method according to the invention further comprises the step of electrospinning and/or centrifugal spinning and/or electrocentrifugal spinning a second cation exchange layer comprising a second cation exchange polymer and/or the step of electrospinning and/or centrifugal spinning and/or electrocentrifugal spinning a second anion exchange layer comprising a second anion exchange layer.

Optionally, the first cation exchange polymer and the second cation exchange polymer are the same, and/or the first anion exchange polymer and the second anion exchange polymer are the same.

The step of electrospinning and/or centrifugal spinning and/or electrocentrifugal spinning a second cation exchange layer comprising a second cation exchange polymer and/or the step of electrospinning and/or centrifugal spinning and/or electrocentrifugal spinning a second anion exchange layer comprising a second anion exchange polymer may be performed in addition to the step of electrospinning and/or centrifugal spinning and/or electrocentrifugal spinning the first cation exchange layer and/or the step of electrospinning and/or centrifugal spinning and/or electrocentrifugal spinning the first anion exchange layer.

Therefore, as an alternative, the method according to the invention may start with the step of electrospinning and/or centrifugal spinning and/or electrocentrifugal spinning a second cation exchange layer comprising a second cation exchange polymer. Preferably, the second cation exchange layer is assembled adjacent to or on a carrier, wherein the carrier may be inert to the second cation exchange layer. Said step may be followed by the step of electrospinning and/or centrifugal spinning and/or electrocentrifugal spinning a first cation exchange layer, wherein the first cation exchange layer is assembled adjacent to the second cation exchange layer. The bipolar membrane is further assembled as described above.

In another alternative embodiment, the step of electrospinning and/or centrifugal spinning and/or electrocentrifugal spinning a second cation exchange layer is performed after the step of electrospinning and/or centrifugal spinning and/or electrocentrifugal spinning a first cation exchange layer. It is noted that the step of electrospinning and/or centrifugal spinning and/or electrocentrifugal spinning a second cation exchange layer may be performed as a final step of assembling the layers or an intermediate step of assembling the layers.

In another alternative embodiment, the method according to the invention may start with the step of electrospinning and/or centrifugal spinning and/or electrocentrifugal spinning a second anion exchange layer comprising a second anion exchange polymer. Preferably, the second anion exchange layer is assembled adjacent to or on a carrier, wherein the carrier may be inert to the second anion exchange layer. Said step may be followed by the step of electrospinning and/or centrifugal spinning and/or electrocentrifugal spinning a first anion exchange layer, wherein the first anion exchange layer is assembled adjacent to the second anion exchange layer. The bipolar membrane is further assembled as described above.

An advantage of the method comprising the step of electrospinning and/or centrifugal spinning and/or electrocentrifugal spinning a second cation exchange layer comprising a second cation exchange polymer adjacent to the first cation exchange layer and/or the step of electrospinning and/or centrifugal spinning and/or electrocentrifugal spinning a second anion exchange layer comprising a second anion exchange polymer adjacent to the first anion exchange layer is that the first cation exchange layer and/or first anion exchange layer are protected against harsh conditions. As a result, the valuable first water splitting catalyst and/or the second water splitting catalyst are protected. Therefore, the efficiency of the bipolar membrane is maintained and does not degrade due to loss of water splitting catalyst over the lifespan of the bipolar membrane.

In a preferred embodiment according to the invention, the step of electrospinning and/or centrifugal spinning and/or electrocentrifugal spinning a first cation exchange layer and/or the step of electrospinning and/or centrifugal spinning and/or electrocentrifugal spinning a first anion exchange layer comprises gradually electrospraying the first water splitting catalyst and/or the second water splitting catalyst. Preferably, the concentration of the first water splitting catalyst and/or the second water splitting catalyst declines in a direction extending from the adjacent junction layer.

It is note that gradually refers to an increasing or a decreasing concentration of the first water splitting catalyst and/or the second water splitting catalyst over the thickness of the layer. It will be understood that the concentration of the cation exchange polymer and/or the anion exchange polymer shows an inverse relation. In other words, the concentration of the first water splitting catalyst and/or the second water splitting catalyst changes or fluctuates over the thickness of the first cation exchange layer and/or first anion exchange layer.

In addition, it is noted that the thickness of the desired layer(s) is defined in the direction which is substantially perpendicular to the adjacent side of the junction layer.

Using dual electrospinning and/or centrifugal spinning and/or electrocentrifugal spinning enables to include two compounds with different properties in a single layer. In that respect, the method according to the invention enables to include an aqueous solution/dispersion of the first water splitting catalyst and/or the second water splitting catalyst and a non-aqueous solution/dispersion of a cation exchange polymer and/or an anion exchange polymer. As a result, a combination of compounds may be included in a single layer.

Another advantage of gradually electrospraying the first water splitting catalyst and/or the second water splitting catalyst is that a high concentration of the first water splitting catalyst and/or second water splitting catalyst may be applied close to the junction layer and/or that the junction layer and first cation exchange layer and/or first anion exchange layer may gently merge into each other. As a result, the coupling between both layers is severe and a stronger membrane is achieved. It is noted that coupling may refer to integration of two adjacent layers and/or anchorage of two adjacent layers.

Another advantage is that all layers gently merge in each other. For example, the concentration of the first water splitting catalyst and/or the second splitting catalyst may be zero at the surface opposite of the surface adjacent to the junction layer of the cation exchange layer and/or anion exchange layer. This enables to reduce the amount of layers and reduces the number of connections between layers.

In a preferred embodiment, the method according to the invention involves a continuous electrospinning and/or centrifugal spinning and/or electrocentrifugal spinning method, wherein the different compounds are included to a layer simultaneously. By changing the concentration and/or composition of an input, different structures/compositions of within the bipolar membrane may be achieved. This may be achieved by using multiple spinnerets, for example two or three spinnerets. As a result, a bipolar membrane is achieved wherein the layers are defined by the composition over a defined thickness of the bipolar membrane. For conventional bipolar membranes, the layers are defined by the edge between the different prefabricated layers.

In a preferred embodiment according to the invention, the first water splitting catalyst and the second water splitting catalyst are one or more independently selected from the group of porous silica materials, aluminium silicates, zeolites, organic catalysts. Preferably, the organic catalyst is one or more selected from the group of poly(4-vinylphenol), polyethylene glycol.

In a preferred embodiment according to the invention, the first water splitting catalyst and the second water splitting catalyst may be one or more independently selected from the group of MCM-41, $TiO_2$, $IrO_2$, $Al(OH)_3$, graphene oxide, graphite oxide, ZIF-7, ZIF-8, ZIF-90, MOF-5, IRMOF-1, HKUST-1, CuTPA, $SiO_2$, $Mn(HCOO)_2$. Preferably, the first water splitting catalyst and/or the second water splitting catalyst may be MCM-41.

It is noted that MCM-41 is a tradename, and is a mesoporous silica catalyst developed.

It is also noted that:
ZIF-7 (Zeolitic Imidazolate Framework 7) is $Zn(bim)_2$, wherein bim refers to benzimidazole, and is formed by connecting Zn (II) ions with benzimidazole anions;
ZIF-8 (Zeolitic Imidazolate Framework 8) is formed by Zn (II) ions coordinated by four imidazolate rings;
ZIF-90 (Zeolitic Imidazolate Framework 90) is formed by Zn (II)-nitrate and imidazolate-2-carboxyaldehyde;
MOF-5 is a cubic metal-organic framework with the formula $Zn_4O(BDC)_3$, wherein BDC is 1,4-benzodicarboxylate;
IRMOF-1 is a cubic metal-organic framework with the formula $Zn_4O(BDC)_3$, wherein BDC is 1,4-benzodicarboxylate;
HKUST-1 is a framework of dimeric metal units connected with benzene-1,3,5-tricarboxylate as e.g. copper benzene-1,3,5-tricarboxylate; and
Cu-TPA is copper terephthalate.

It was found that a first water splitting catalyst and a second water splitting catalyst being one or more independently selected from the group of MCM-41, $TiO_2$, $IrO_2$, $Al(OH)_3$, graphene oxide, graphite oxide, ZIF-7, ZIF-8, ZIF-90, MOF-5, IRMOF-1, HKUST-1, CuTPA, $SiO_2$, $Mn(HCOO)_2$, provides an efficient and effective bipolar membrane. Furthermore, it was found that the first water splitting catalyst and/or the second water splitting catalyst being MCM-41 provides an efficient and effective bipolar membrane. Preferably, the first water splitting catalyst and the second water splitting catalyst are the same.

An advantage of the first water splitting catalyst and the second water splitting catalyst being the same is that only one solution/dispersion as to be provided to one of the spinnerets of an electrospinning and/or centrifugal spinning and/or electrocentrifugal spinning device.

In a preferred embodiment according to the invention, the junction layer comprises a third cation exchange polymer and/or a third anion exchange polymer.

Providing a junction layer comprising a third cation exchange polymer and/or a third anion exchange polymer enables an efficient and effective bipolar membrane. Preferably, the third cation exchange polymer is provided by a spinneret and the third anion exchange polymer is provided by another spinneret.

In a preferred embodiment, the first cation exchange polymer and/or the second cation exchange polymer and/or the third cation exchange polymer are the same. In a further preferred embodiment, the first anion exchange polymer and/or the second anion exchange polymer and/or the third anion exchange polymer are the same.

In a preferred embodiment according to the invention, each cation exchange polymer may be one or more independently selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone.

Experiments showed that the cation exchange polymer being one or more selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone provides an efficient and effective bipolar membrane.

It is noted that each cation exchange polymer, such as the first cation exchange polymer, the second cation exchange polymer, and the third cation exchange polymer, is independently selected from said group. Thus, the first cation exchange polymer may be one or more selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone. The second cation exchange polymer and/or the third cation exchange polymer may optionally be one or one or more independently selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone.

In a preferred embodiment according to the invention, each anion exchange polymer may be one or more independently selected from the group of quaternized poly(p-phenylene oxide), quaternized polyepichlorhydrine, poly(spirobiindane-aryl ether sulfone) copolymers, polyethylene oxide, quaternized polyethersulfone, FAA-3.

It is noted that FAA-3 is a trade name, and refers to a polymer based on poly [oxy(2,6-dimethyl-1,4-phenylene)] and/or an aromatic polymer polyphenylene oxide with quaternary ammonium groups.

Experiments showed that the anion exchange polymer being one or more selected from the group of quaternized poly(p-phenylene oxide), quaternized polyepichlorhydrine, poly(spirobiindane-aryl ether sulfone) copolymers, polyethylene oxide, quaternized polyethersulfone, FAA-3 provides an efficient and effective bipolar membrane.

It is noted that each anion exchange polymer, such as the first anion exchange polymer, the second anion exchange polymer, and the third anion exchange polymer, is independently selected from said group. Thus, the first anion exchange polymer may be one or more selected from the group of quaternized poly(p-phenylene oxide), quaternized polyepichlorhydrine, poly(spirobiindane-aryl ether sulfone) copolymers, polyethylene oxide, quaternized polyethersulfone, FAA-3. The second anion exchange polymer and/or the third anion exchange polymer may optionally be one or one or more independently selected from the group of quaternized poly(p-phenylene oxide), quaternized polyepichlorhydrine, poly(spirobiindane-aryl ether sulfone) copolymers, polyethylene oxide, quaternized polyethersulfone, FAA-3.

In a preferred embodiment, the first cation exchange polymer and second cation exchange polymer and/or the third cation exchange polymer may be the same. Furthermore, the first anion exchange polymer and the second anion exchange polymer and/or the third anion exchange polymer may be the same.

In a preferred embodiment according to the invention, each cation exchange polymer may be sulfonated poly ether ether ketone and/or each anion exchange polymer may be FAA-3.

It was found that sulfonated poly ether ether ketone as cation exchange polymer and/or FAA-3 as anion exchange polymer provides an efficient and effective bipolar membrane. In fact, efficient and effective dissociation of water was achieved with a bipolar membrane wherein each cation exchange polymer may be sulfonated poly ether ether ketone and/or each anion exchange polymer may be FAA-3.

In a preferred embodiment according to the invention, each of the one or more cation exchange polymer and/or each of the one or more anion exchange polymer may be dissolved and/or dispersed in a solvent and/or dispersant, wherein for each exchange polymer the solvent may be one or more independently selected from the group of dimethylacetamide, dimethylformamide, propanol, dimethyl sulfoxide, N-methyl-2-pyrrolidone.

It is noted that the solvent and/or dispersant is independently selected from the group of dimethylacetamide, dimethylformamide, propanol, dimethyl sulfoxide, N-methyl-2-pyrrolidone for each individual exchange polymer. In other words, the solvent and/or dispersant is independently selected for the first cation exchange polymer and/or the second cation exchange polymer and/or the third cation exchange polymer and/or the first anion exchange polymer and/or the second anion exchange polymer and/or the third anion exchange polymer from the group of dimethylacetamide, dimethylformamide, propanol, dimethyl sulfoxide, N-methyl-2-pyrrolidone. Preferably, the solvent/dispersant is dimethylacetamide.

An advantage of independently selecting the solvent and/or dispersant for the different cation exchange polymers and anion exchange polymers is that said polymers may be independently provided to the preferred layer. Using multiple electrospinning and/or centrifugal spinning and/or electrocentrifugal spinning enables to include different (exchange) polymers simultaneously in the preferred layer.

In a preferred embodiment, the (exchange) polymers may be dissolved/dispersed in the solvent/dispersant wherein the solution/dispersion comprises 15 wt. % to 30 wt. % (exchange) polymer. Preferably, the cation exchange polymer may be dissolved/dispersed in the range of 15 wt. % to 25 wt. % in the solvent/dispersant, preferably in the range of 18 wt. % to 22 wt. %, and/or the anion exchange polymer may be dissolved/dispersed in the range of 20 wt. % to 30 wt. % in the solvent/dispersant, preferably in the range of 24 wt. % to 28 wt. %.

In a preferred embodiment according to the invention, the first water splitting catalyst and the second water splitting catalyst may be dissolved and/or dispersed in a solvent and/or dispersant, wherein for each water splitting catalyst the solvent and/or dispersant may be one or more independently selected from the group of water, methanol, ethanol, propanol.

Dissolving and/or dispersing the first water splitting catalyst and/or the second water splitting catalyst in one or more independently selected from the group of water, methanol, ethanol, propanol provides enables to perform the step of electrospinning and/or centrifugal spinning and/or electrocentrifugal spinning a first cation exchange layer and electrospinning and/or centrifugal spinning and/or electrocentrifugal spinning a first anion exchange layer respectively efficiently and effectively.

It was found that that a solution and/or dispersion comprising 90% water and 10% ethanol provide an efficient and effective solution/dispersion comprising the first water splitting catalyst and/or the second water splitting catalyst.

Furthermore, the first water splitting catalyst and/or the second water splitting catalyst may be present in the solution/dispersion comprising the first water splitting catalyst or the second water splitting catalyst in an amount of 0.1 wt. % to 5 wt. %, preferably in an amount of 0.5 wt. % to 3 wt. %, more preferably in an amount of 1 wt. % to 2.5 wt. %, most preferably in an amount of about 2 wt. %.

Providing the solution/dispersion comprising the first water splitting catalyst or second water splitting catalyst in an amount of 0.1 wt. % to 5 wt. %, preferably in an amount of 0.5 wt. % to 3 wt. %, more preferably in an amount of 1 wt. % to 2.5 wt. %, most preferably in an amount of about 2 wt. % to the step of electrospinning and/or centrifugal spinning and/or electrocentrifugal spinning a first cation exchange layer or electrospinning and/or centrifugal spinning and/or electrocentrifugal spinning a first anion exchange layer respectively, enables an efficient and effective method according to the invention.

In a preferred embodiment, the first water splitting catalyst and/or the second water splitting catalyst are dissolved and/or dispersed in 90% water and 10% ethanol, preferably the first water splitting catalyst and the second water splitting catalyst are MCM-41, and the cation exchange polymer and/or anion exchange polymer are dissolved and/or dispersed in dimethylacetamide. Preferably, the first water splitting catalyst and/or the second water splitting catalyst solution and/or dispersion comprise about 2 wt. % of the first water splitting catalyst and/or the second water splitting catalyst, and the cation exchange polymer and/or anion exchange polymer solution and/or dispersion comprise 18 wt. % to 22 wt. % cation exchange polymer or 24 wt. % to 28 wt. % anion exchange polymer. Said solutions/dispersions are used in the step of electrospinning and/or centrifugal spinning and/or electrocentrifugal spinning a junction layer, the step of electrospinning and/or centrifugal spinning and/or electrocentrifugal spinning a first cation exchange layer and/or, the step of electrospinning and/or centrifugal spinning and/or electrocentrifugal spinning a first anion exchange layer.

In a preferred embodiment according to the invention, wherein the method according to the invention further comprises the step of pressing, preferably the step of pressing comprising the step of hot-pressing. Preferably, wherein the step of hot-pressing may be performed at a temperature in the range of 120° C. to 180° C., preferably in the range of 130° C. to 170° C., more preferably in the range of 140° C. to 160° C., most preferably about 150° C.

Pressing the different layers enables to compact/dense the different layers and/or membrane. As a result, an efficient and effective membrane may be achieved. In fact, a bipolar membrane with a lower transmembrane voltage compared to conventional bipolar membranes was achieved.

In a preferred embodiment according to the invention, the step of hot-pressing may be performed at a pressure in the range of 150 bar to 250 bar, preferably in the range of 175 bar to 225 bar, more preferably in the range of 195 bar to 205 bar, most preferably about 200 bar. Preferably, the step of hot-pressing may be performed for a period of at most 2 hours, preferably in the range of 0.1 hour to 2 hours, more preferably in the range of 0.1 hour to 1.5 hour, even more preferably in the range of 0.1 hour to 1 hour, most preferably in the range of 0.1 hour to 0.25 hour.

Performing the step of hot-pressing at a pressure in the range of 150 bar to 250 bar, preferably in the range of 175 bar to 225 bar, more preferably in the range of 195 bar to 205 bar, most preferably about 200 bar, for a period of at most 2 hours, preferably in the range of 0.1 hour to 2 hours, more preferably in the range of 0.1 hour to 1.5 hour, even more preferably in the range of 0.1 hour to 1 hour, most preferably in the range of 0.1 hour to 0.25 hour, provides an efficient and effective membrane with an efficient and effective water dissociation.

In a preferred embodiment, the step of pressing provides a bipolar membrane with a thickness in the range of 30 µm to 120 µm, preferably a thickness in the range of 30 µm to 100 µm, more preferably a thickness in the range of 30 µm to 80 µm.

In a preferred embodiment according to the invention, the method according to the invention further comprises the step of conditioning the bipolar membrane. Preferably, the step of conditioning may be performed in an aqueous solution of sodium chloride comprising a concentration in the range of 0.5 M to 1.5 M, preferably in the range of 0.75 M to 1.25 M, more preferably about 1 M.

The step of conditioning the membrane in an aqueous solution of sodium chloride comprising a concentration in the range of 0.5 M to 1.5 M, preferably in the range of 0.75 M to 1.25 M, more preferably about 1 M provides a cost-effective bipolar membrane.

The invention also relates to a bipolar membrane comprising:
- a junction layer;
- a first cation exchange layer comprising a first water splitting catalyst and a first cation exchange polymer, wherein the first cation exchange layer may be assembled adjacent to the junction layer; and
- a first anion exchange layer comprising a second water splitting catalyst and a first anion exchange polymer, wherein the first anion exchange layer may be assembled adjacent to the junction layer,
wherein the first cation exchange layer comprises a concentration of the first water splitting catalyst and/or the first anion exchange layer comprises a concentration of the second water splitting catalyst which varies in a direction extending from the adjacent junction layer.

In other words, a bipolar membrane wherein the first cation exchange layer comprises a concentration of the first water splitting catalyst which varies in a direction extending from the adjacent junction layer and/or the first anion exchange layer comprises a concentration of the second water splitting catalyst which varies in a direction extending from the adjacent junction layer.

The bipolar membrane provides the same or similar effects and advantages as those described for the method according to the invention.

It is noted that assembling the different layers includes operatively coupling the layers (cation exchange layer, junction layer, anion exchange layer). Operatively coupled refers to an interaction between the layers, such that protons and/or anions and/or electrons may be transported from one side of the bipolar membrane to the other side of the membrane.

An advantage of the bipolar membrane according to the invention is that the bipolar membrane comprises nanomaterials into polymeric nanofibrous structures which are introduced in a controlled and homogeneous manner by enabling the simultaneous use of aqueous solutions and/or dispersions and organic solvent and/or dispersant based polymeric solutions and/or dispersions by means of dual electrospinning and/or centrifugal spinning and/or electrocentrifugal spinning.

In a preferred embodiment according to the invention, the bipolar membrane further comprises a second cation exchange layer comprising a second cation exchange polymer, wherein the second cation exchange layer may be assembled adjacent to the first cation exchange layer and/or a second anion exchange layer comprising a second anion exchange polymer, wherein the second anion exchange layer may be assembled adjacent to the first anion exchange layer.

An advantage of the bipolar membrane comprising a second cation exchange layer comprising a second cation exchange polymer adjacent to the first cation exchange layer and/or a second anion exchange layer comprising a second anion exchange polymer adjacent to the first anion exchange layer is that the first cation exchange layer and/or first anion exchange layer are protected against harsh conditions. As a result, the valuable first water splitting catalyst and/or the valuable second water splitting catalyst are protected. Therefore, the efficiency of the bipolar membrane is maintained and does not degrade due to loss of the first water splitting catalyst and/or loss of the second water splitting catalyst over the lifespan of the bipolar membrane.

Furthermore, as a result to the protective layer, a cost-effective membrane is achieved.

In a preferred embodiment according to the invention, the first water splitting catalyst and the second water splitting catalyst may be one or more independently selected from the group of MCM-41, $TiO_2$, $IrO_2$, $Al(OH)_3$, graphene oxide, graphite oxide, ZIF-7, ZIF-8, ZIF-90, MOF-5, IRMOF-1, HKUST-1, CuTPA, $SiO_2$, $Mn(HCOO)_2$. Preferably, the first water splitting catalyst and the second water splitting catalyst may be the same. In a preferred embodiment the first water splitting catalyst and/or the second water splitting catalyst may be MCM-41.

An advantage of the first water splitting catalyst and the second water splitting catalyst being the same is that only one solution/dispersion as to be provided to one of the spinnerets of an electrospinning and/or centrifugal spinning and/or electrocentrifugal spinning device.

In a preferred embodiment according to the invention, the junction layer comprises a third cation exchange polymer and/or a third anion exchange polymer.

Providing a junction layer comprising a third cation exchange polymer and/or a third anion exchange polymer enables an efficient and effective bipolar membrane. Preferably, the third cation exchange polymer is provided by a spinneret and the third anion exchange polymer is provided by another spinneret.

In a preferred embodiment, the first cation exchange polymer and/or the second cation exchange polymer and/or the third cation exchange polymer are the same. In a further preferred embodiment, the first anion exchange polymer and/or the second anion exchange polymer and/or the third anion exchange polymer are the same.

In a preferred embodiment according to the invention, each cation exchange polymer may be one or more independently selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone.

It is noted that each cation exchange polymer, such as the first cation exchange polymer, the second cation exchange polymer, and the third cation exchange polymer, is independently selected from said group. Thus, the first cation exchange polymer may be one or more selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone. The second cation exchange polymer and/or the third cation exchange polymer may optionally be one or one or more independently selected from the group of sulfonated poly ether ether ketone, a copolymer of poly(tetrafluoroethylene) and polysulfonyl fluoride vinyl ether, sulfonated poly(2,6-dimethyl-1,4-phenylene oxide), sulfonated polyether sulfone.

In a preferred embodiment according to the invention, each anion exchange polymer may be one or more independently selected from the group of quaternized poly(p-phenylene oxide), quaternized polyepichlorhydrine, poly(spirobiindane-aryl ether sulfone) copolymers, polyethylene oxide, quaternized polyethersulfone, FAA-3.

It is noted that each anion exchange polymer, such as the first anion exchange polymer, the second anion exchange polymer, and the third anion exchange polymer, is independently selected from said group. Thus, the first anion exchange polymer may be one or more selected from the group of quaternized poly(p-phenylene oxide), quaternized polyepichlorhydrine, poly(spirobiindane-aryl ether sulfone) copolymers, polyethylene oxide, quaternized polyethersulfone, FAA-3. The second anion exchange polymer and/or third anion exchange polymer may optionally be one or one or more independently selected from the group of quaternized poly(p-phenylene oxide), quaternized polyepichlorhydrine, poly(spirobiindane-aryl ether sulfone) copolymers, polyethylene oxide, quaternized polyethersulfone, FAA-3.

In a preferred embodiment according to the invention, the bipolar membrane does not comprise a spacer.

It is noted that a bipolar membrane without a spacer enables to assemble a bipolar membrane comprising layers which are not separated to each other, and it enables to continuously assemble the bipolar membrane. In other words, the bipolar membrane is not disturbed by individual layers.

The invention also relates to a bipolar membrane according to the invention obtainable by the method according to the invention and/or a bipolar membrane obtainable by the method according to the invention.

The bipolar membrane according to the invention obtainable by the method according to the invention and/or bipolar membrane obtainable by the method according to the invention provides the same effects and advantages as those described for the method according to the invention.

In a preferred embodiment, the bipolar membrane has a thickness in the range of 30 µm to 120 µm, preferably a thickness in the range of 30 µm to 100 µm, more preferably a thickness in the range of 30 µm to 80 µm.

The invention further also relates to a use of a bipolar membrane according to the invention in hydrogen production, acid-base flow batteries, fuel cells, carbon dioxide capture, and/or inorganic and/or organic acid-base production and/or recovery.

The use of the bipolar membrane according to the invention provides the same effects and advantages as those described for the method according to the invention and the bipolar membrane according to the invention.

Using the bipolar membrane according to the invention provides efficient and effective hydrogen production, acid-base flow batteries, fuel cells, carbon dioxide capture, and/or inorganic and/or organic acid-base production and/or recovery.

In a preferred embodiment according to the invention, the bipolar membrane comprises a current density of at least 1000 A m$^2$ having an overpotential of less than 100 mV.

In a preferred embodiment, the current density of at least 1000 A m$^2$ having an overpotential of less than 100 mV, is compared to the reversible potential of 828 mV for water splitting into $H^+$ and $OH^-$.

The invention further also relates to a system comprising a bipolar membrane according to the invention.

The system according to the invention provides the same effects and advantages as those described for the method according to the invention, bipolar membrane according to the invention, and the use of the bipolar membrane according to the invention.

Further advantages, features and details of the invention are elucidated on the basis of preferred embodiments thereof, wherein reference is made to the accompanying drawings, in which.

Method 10 (FIG. 1) for assembling a bipolar membrane follows a sequence of different steps.

Figure 1:
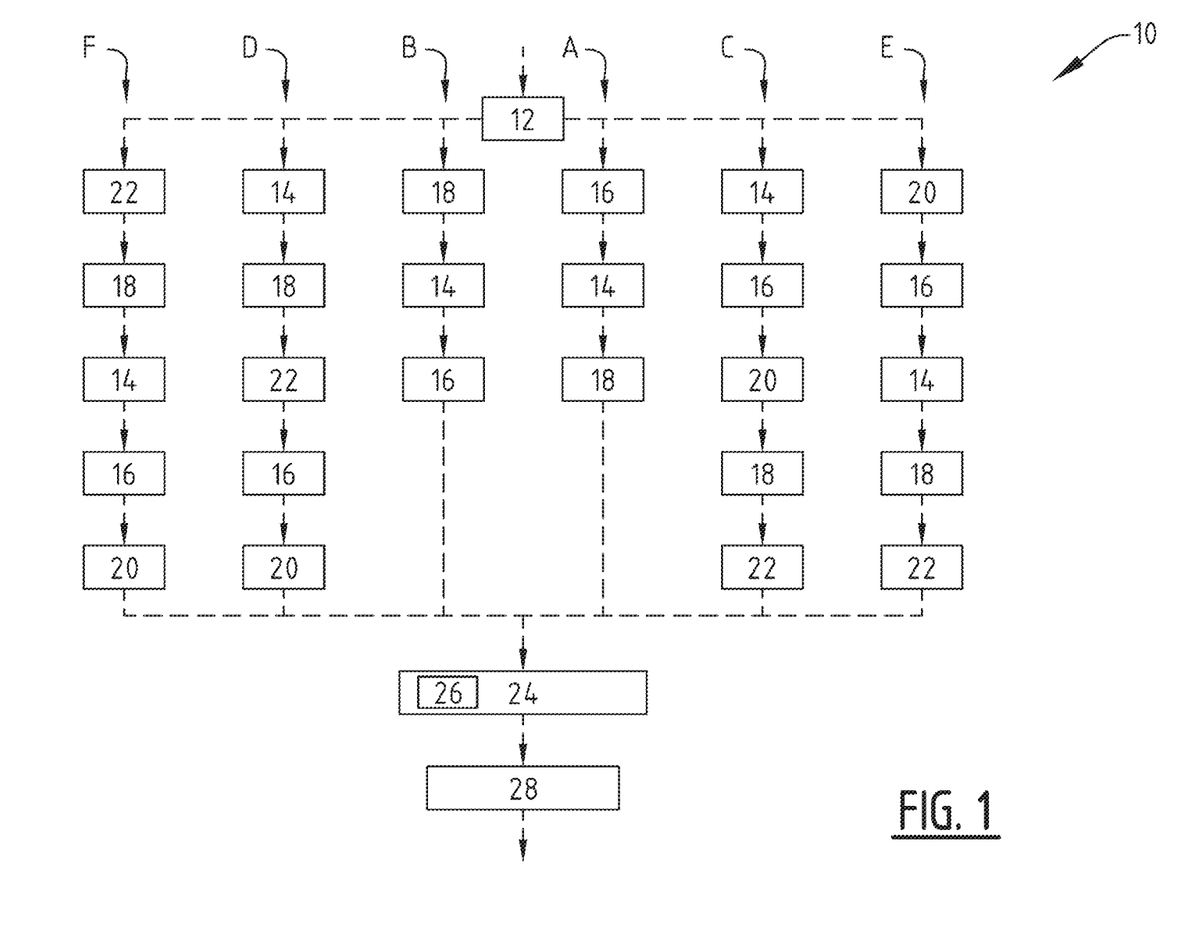
FIG. 1 shows a schematic overview of a method according to the invention.

In the illustrated embodiment method 10A starts with step 16 of electrospinning and/or centrifugal spinning and/or electrocentrifugal spinning a first cation exchange layer comprising a first water splitting catalyst and a first cation exchange polymer. Optionally, method 10 starts with step 12 of providing a carrier followed by step 16. Step 16 may be followed by step 14 of electrospinning and/or centrifugal spinning and/or electrocentrifugal spinning a junction layer adjacent to the first cation exchange layer. Optionally, the junction layer comprises a third cation exchange polymer and/or a third anion exchange polymer. Step 14 may then be followed by step 18 of electrospinning and/or centrifugal spinning and/or electrocentrifugal spinning a first anion exchange layer comprising an second water splitting catalyst and a first anion exchange polymer adjacent to the junction layer. To assemble a semi-finished bipolar membrane.

Alternatively, in the illustrated embodiment method 10B starts with step 18 of electrospinning and/or centrifugal spinning and/or electrocentrifugal spinning a first anion exchange layer comprising a second water splitting catalyst and a first anion exchange polymer. Optionally, method 10 starts with step 12 of providing a carrier followed by step 18. Step 18 may be followed by step 14 of electrospinning and/or centrifugal spinning and/or electrocentrifugal spinning a junction layer adjacent to the first anion exchange layer. Optionally, the junction layer comprises a third cation exchange polymer and/or a third anion exchange polymer. Step 14 may then be followed by step 16 of electrospinning and/or centrifugal spinning and/or electrocentrifugal spinning a first cation exchange layer comprising a first water splitting catalyst and a first cation exchange polymer adjacent to the junction layer. To assemble a semi-finished bipolar membrane.

Alternatively, in the illustrated embodiment method 10C starts with step 14 of electrospinning and/or centrifugal spinning and/or electrocentrifugal spinning a junction layer. Optionally, the junction layer comprises a third cation exchange polymer and/or a third anion exchange polymer. Optionally, method 10 starts with step 12 of providing a carrier followed by step 14. Step 14 may be followed by step 16 of electrospinning and/or centrifugal spinning and/or electrocentrifugal spinning a first cation exchange layer comprising a first water splitting catalyst and a first cation exchange polymer adjacent to the junction layer, followed by step 20 of electrospinning and/or centrifugal spinning and/or electrocentrifugal spinning a second cation exchange layer comprising a second cation exchange polymer adjacent to the first cation exchange layer. Step 20 may than be followed by step 18 of electrospinning and/or centrifugal spinning and/or electrocentrifugal spinning a first anion exchange layer comprising a second water slitting catalyst and a first anion exchange polymer adjacent to the junction layer, and followed by step 22 of electrospinning and/or centrifugal spinning and/or electrocentrifugal spinning a second anion exchange layer comprising a second anion exchange polymer adjacent to the first anion exchange layer. To assemble a semi-finished bipolar membrane.

Alternatively, in the illustrated embodiment method 10D starts with step 14 of electrospinning and/or centrifugal spinning and/or electrocentrifugal spinning a junction layer. Optionally, the junction layer comprises a third cation exchange polymer and/or a third anion exchange polymer. Optionally, method 10 starts with step 12 of providing a carrier followed by step 14. Step 14 may be followed by step 18 of electrospinning and/or centrifugal spinning and/or electrocentrifugal spinning a first anion exchange layer comprising a second water splitting catalyst and a first anion exchange polymer adjacent to the junction layer, and followed by step 22 of electrospinning and/or centrifugal spinning and/or electrocentrifugal spinning a second anion exchange layer comprising a second anion exchange polymer adjacent to the first anion exchange layer. Step 22 may than be followed by step 16 of electrospinning and/or centrifugal spinning and/or electrocentrifugal spinning a first cation exchange layer comprising a first water splitting catalyst and a first a first cation exchange polymer adjacent to the junction layer, followed by step 20 of electrospinning and/or centrifugal spinning and/or electrocentrifugal spinning a second cation exchange layer comprising a second cation exchange polymer adjacent to the first cation exchange layer. To assemble a semi-finished bipolar membrane.

Alternatively, in the illustrated embodiment method 10E starts with step 20 of electrospinning and/or centrifugal spinning and/or electrocentrifugal spinning a second cation exchange layer comprising a second cation exchange polymer. Optionally, method 10 starts with step 12 of providing a carrier followed by step 20. Step 20 may be followed by step 16 of electrospinning and/or centrifugal spinning and/or electrocentrifugal spinning a first cation exchange layer comprising a first water splitting catalyst and a first cation exchange polymer adjacent to the second cation exchange layer. Then, step 16 may be followed by step 14 of electrospinning and/or centrifugal spinning and/or electrocentrifugal spinning a junction layer adjacent to the first cation exchange layer. Optionally, the junction layer comprises a third cation exchange polymer and/or a third anion exchange polymer. Step 14 may be followed by step 18 of electrospinning and/or centrifugal spinning and/or electrocentrifugal spinning a first anion exchange layer comprising a second water splitting catalyst and a first anion exchange polymer adjacent to the junction layer, and step 22 of electrospinning and/or centrifugal spinning and/or electrocentrifugal spinning a second anion exchange layer comprising a second anion exchange polymer adjacent to the first anion exchange layer. To assemble a semi-finished bipolar membrane.

Alternatively, in the illustrated embodiment method 10F starts with step 22 of electrospinning and/or centrifugal spinning and/or electrocentrifugal spinning a second anion exchange layer comprising a second anion exchange polymer. Optionally, method 10 starts with step 12 of providing a carrier followed by step 22. Step 22 may be followed by step 18 of electrospinning and/or centrifugal spinning and/or electrocentrifugal spinning a first anion exchange layer comprising a second water splitting catalyst and a first anion exchange polymer adjacent to the second anion exchange layer. Then, step 18 may be followed by step 14 of electrospinning and/or centrifugal spinning and/or electrocentrifugal spinning a junction layer adjacent to the first anion exchange layer. Optionally, the junction layer comprises a third cation exchange polymer and/or a third anion exchange polymer. Step 14 may be followed by step 16 of electrospinning and/or centrifugal spinning and/or electrocentrifugal spinning a first cation exchange layer comprising a first water splitting catalyst and a first cation exchange polymer adjacent to the junction layer, and step 20 of electrospinning and/or centrifugal spinning and/or electrocentrifugal spinning a second cation exchange layer comprising a second cation exchange polymer adjacent to the first cation exchange layer. To assemble a semi-finished bipolar membrane.

The assembled semi-finished bipolar membrane may than be pressed by step 24 of pressing, wherein step 24 preferably comprises step 26 of step of hot-pressing. Step 24 is followed by step 28 of conditioning the bipolar membrane.

In a preferred embodiment, the steps 14, 16, 18, 20, and 22 are part of a continuous process, wherein the water splitting catalysts and/or (exchange) polymers are included in the semi-finished bipolar membrane using multiple, such as dual, electrospinning and/or centrifugal spinning and/or electrocentrifugal spinning. Therefore, a first spinneret may provide the first water splitting catalyst and a second spinneret may provide the cation exchange polymer, or a first spinneret may provide the cation exchange polymer and a second spinneret may provide the anion exchange polymer, or a first spinneret may provide the second water splitting catalyst and a second spinneret may provide the anion exchange polymer.

Figure 2:
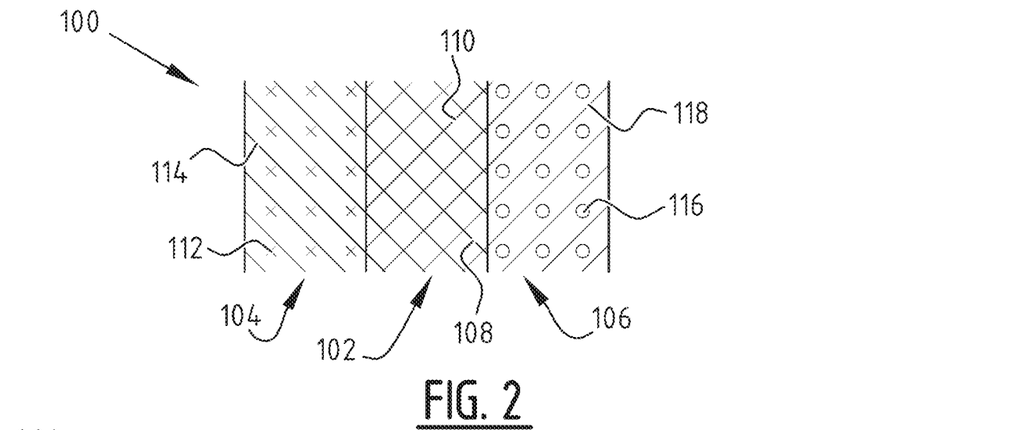
FIG. 2 shows a schematic overview of a bipolar membrane according to the invention comprising a junction layer, first cation exchange layer, and a first anion exchange layer.

In an illustrated embodiment bipolar membrane 100 (FIG. 2) comprises junction layer 102, first cation exchange layer 104, and first anion exchange layer 106. Junction layer 102 comprises third cation exchange polymer 108 (lines from left top to right bottom) and third anion exchange polymer 110 (lines from left bottom to right top). First cation exchange layer 104 comprises first water splitting catalyst 112 (crosses) and first cation exchange polymer 114 (lines from left top to right bottom). First anion exchange layer 106 comprises second water splitting catalyst 116 (circles) and first anion exchange polymer 118 (lines from left bottom to right top).

Figure 3:
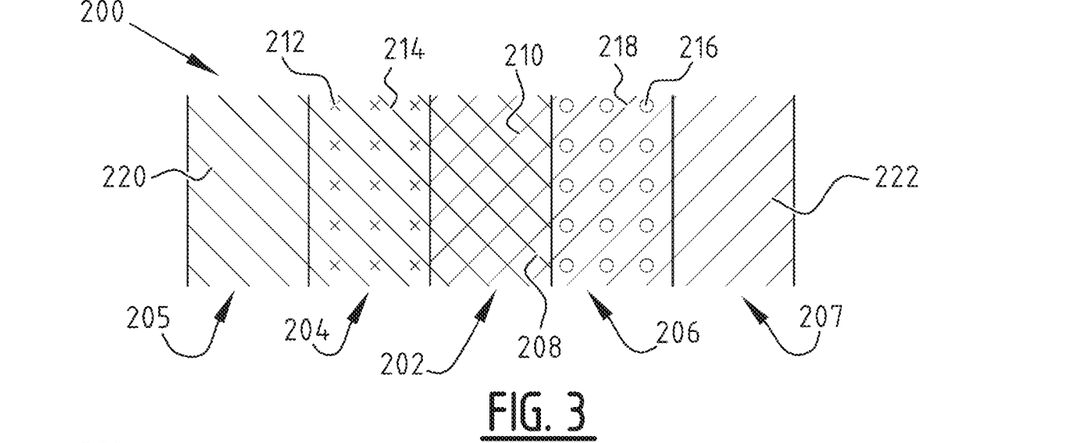
FIG. 3 shows a schematic overview of an alternative bipolar membrane according to the invention comprising a junction layer, first and second cation exchange layer, and a first and second anion exchange layer.

In an illustrated embodiment, alternative bipolar membrane 200 (FIG. 3) comprises junction layer 202, first cation exchange layer 204, second cation exchange layer 205, first anion exchange layer 206, and second anion exchange layer 207. Junction layer 202 comprises third cation exchange polymer 208 (lines from left top to right bottom) and third anion exchange polymer 210 (lines from left bottom to right top). First cation exchange layer 204 comprises first water splitting catalyst 212 (crosses) and first cation exchange polymer 214 (lines from left top to right bottom). Second cation exchange layer 205 comprises second cation exchange polymer 220. First anion exchange layer 206 comprises second water splitting catalyst 216 (circles) and first anion exchange polymer 218 (lines from left bottom to right top). Second anion exchange layer 207 comprises second cation exchange polymer 222. Water splitting catalysts 212, 216 are homogenously distributed over the respective layers or are distributed according to a desired distribution having a gradient, preferably in a direction transversal to junction layer 202.

Figure 4:
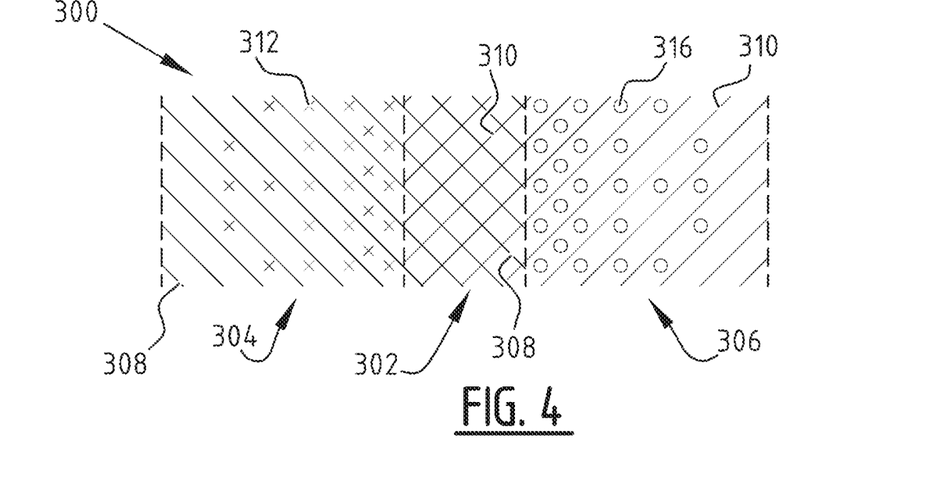
FIG. 4 shows a schematic overview of a further alternative bipolar membrane according to the invention comprising gradually electro sprayed first water splitting catalyst and second water splitting catalyst.

In an illustrated embodiment bipolar membrane 300 (FIG. 4) comprises junction layer 302, first cation exchange layer 304, and first anion exchange layer 306. Junction layer 302 comprises third cation exchange polymer 308 (lines from left top to right bottom) and third anion exchange polymer 310 (lines from left bottom to right top). The cation exchange polymer and anion exchange polymer are preferably the same in junction layer 302 and cation exchange layer 304, and junction layer 302 and anion exchange layer 306 respectively. Cation exchange layer 304 comprises first water splitting catalyst 312 and cation exchange polymer 308. Anion exchange layer 306 comprises second water splitting catalyst 316 and anion exchange polymer 310. Bipolar membrane 300 further shows an increasing concentration of first water splitting catalyst 312 and second water splitting catalyst 316 towards junction layer 302.

The bipolar membrane according to the invention has been tested for its capability of water dissociation by means of electrochemical characterization. The bipolar membrane assembled with the method according to the invention has been compared in terms of the catalytic water dissociation in $H^+$ and $OH^-$ following:

with commercially available bipolar membranes (Fumasep FBM, Fumatech GmbH, Germany).

This commercially available bipolar membrane is, to the best of our knowledge, the best performing commercially available bipolar membrane at the time of filing.

Figure 5:
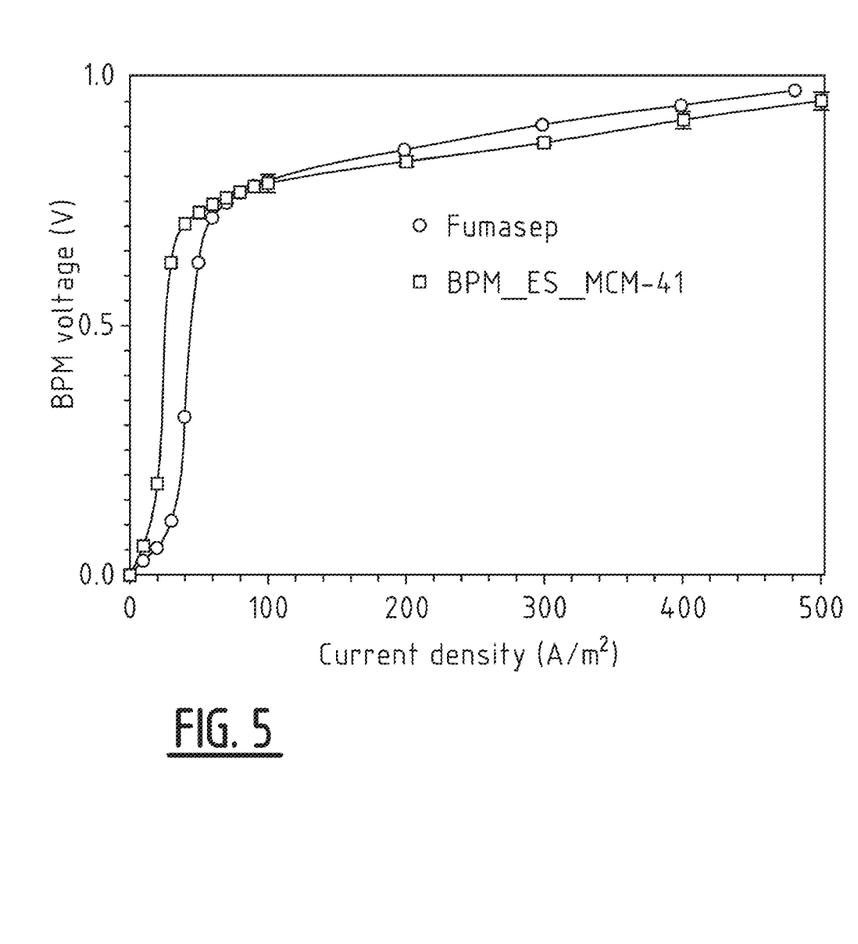
FIG. 5 shows the current density versus bipolar membrane voltage of the bipolar membrane according to the invention and a conventional bipolar membrane.

FIG. 5 shows the bipolar membrane voltage (Volt) versus current density (A m$^{-2}$). The bipolar membrane transmembrane voltage of the bipolar membrane assembled with the method according to the invention was lower than for the Fumasep bipolar membrane as characterized in an aqueous solution of 1 M NaCl using two Ag/AgCl reference electrodes and up to a current density of 500 A m$^{-2}$.

The bipolar membrane assembled with the method according to the invention showed a lower water dissociation voltage of 100 mV compared to the commercially available Fumasep bipolar membrane at 1000 A m$^{-2}$ as tested in 1 M NaCl. The bipolar membrane assembled with the method according to the invention showed a stable behaviour for water splitting in $H^+$ and OH at a current density of 1000 A m$^{-2}$ while having a lower overpotential of 100 mV compared to Fumasep bipolar membrane.

Figure 6:
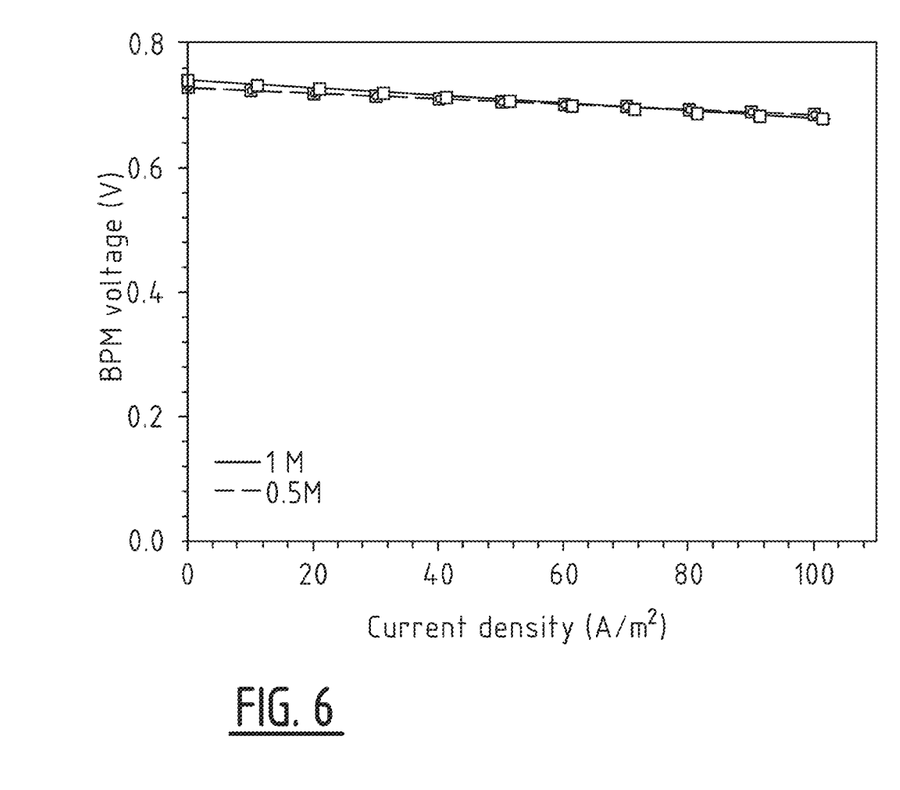
FIG. 6 shows a water association curve for the invented bipolar membrane as tested in 0.5 M and 1 M HCl and NaOH solutions.

Further experiments showed a water association curve for the bipolar membrane assembled with the method according to the invention as tested in 0.5 M and 1 M HCl and NaOH solutions. FIG. 6 presents the voltage drop across the bipolar membrane assembled with the method according to the invention when water combination occurs when testing the bipolar membrane with corresponding HCl and NaOH concentrations across the bipolar membrane.

The system according to the invention may be used for the storage of energy, for example for storage of energy using a pH gradient system. In addition, stacking different cells comprising the bipolar membrane according to the invention results in an increase in storage capacity and stack voltage.

The present invention is by no means limited to the above described preferred embodiments and/or experiments thereof. The rights sought are defined by the following claims within the scope of which many modifications can be envisaged.

The invention claimed is:

1. A method for assembling a bipolar membrane, the method comprising:
at least one of electrospinning, centrifugal spinning, and electrocentrifugal spinning a first cation exchange layer comprising a first water splitting catalyst and a first cation exchange polymer;
at least one of electrospinning, centrifugal spinning, and electrocentrifugal spinning a junction layer; and
at least one of electrospinning, centrifugal spinning, and electrocentrifugal spinning a first anion exchange layer comprising a second water splitting catalyst and a first anion exchange polymer, wherein the first cation exchange layer and the first anion exchange layer are provided adjacent to and on opposite sides of the junction layer;
wherein the first water splitting catalyst and the second water splitting catalyst are one or more independently selected from a group consisting of porous silica materials, aluminium silicates, zeolites, organic catalysts.

2. The method of claim 1 further comprising at least one of electrospinning, centrifugal spinning, and electrocentrifugal spinning a second cation exchange layer comprising at least one of a second cation exchange polymer, and at least one of electrospinning, centrifugal spinning, and electrocentrifugal spinning a second anion exchange layer comprising a second anion exchange polymer.

3. The method of claim 1, wherein at least one of electrospinning, centrifugal spinning, electrocentrifugal spinning a first cation exchange layer, and at least one of electrospinning, centrifugal spinning, and electrocentrifugal spinning a first anion exchange layer comprises at least one of gradually electrospraying the first water splitting catalyst and the second water splitting catalyst.

4. The method of claim 3, wherein a concentration of at least one of the first water splitting catalyst and the second water splitting catalyst declines in a direction extending from the adjacent junction layer.

5. The method of claim 1, wherein the first water splitting catalyst and the second water splitting catalyst are one or more independently selected from a group consisting of MCM-41, $TiO_2$, $IrO_2$, $Al(OH)_3$, graphene oxide, graphite oxide, ZIF-7, ZIF-8, ZIF-90, MOF-5, IRMOF-1, HKUST-1, CuTPA, $SiO_2$, Mn $(HCOO)_2$.

6. The method of claim 1, wherein the junction layer comprises at least one of a third cation exchange polymer and a third anion exchange polymer.

7. The method of claim 1, wherein each cation exchange polymer is one or more independently selected from a group consisting of sulfonated poly-ether ether ketone, a copolymer of poly (tetrafluoroethylene) and polysulfonyl fluoride vinyl ether, sulfonated poly (2,6-dimethyl-1,4-phenylene oxide), sulfonated polyether sulfone and wherein each anion exchange polymer is one or more independently selected from a group of quaternized poly (p-phenylene oxide), quaternized polyepichlorhydrine, poly (spirobiindane-aryl ether sulfone) copolymers, polyethylene oxide, quaternized polyether sulfone.

8. The method of claim 7, wherein each of one or more cation exchange polymer and each of one or more anion exchange polymer are at least one of dissolved and dispersed in at least one of a solvent and a dispersant, wherein, for each exchange polymer, at least one of the solvent and the dispersant is one or more independently selected from a group of dimethylacetamide, dimethylformamide, propanol, dimethyl sulfoxide, and N-methyl-2-pyrrolidone.

9. The method of claim 1, wherein the first water splitting catalyst and the second water splitting catalyst are at least one of dissolved and dispersed in at least one of a solvent and a dispersant, wherein, for each water splitting catalyst, at least one of the solvent and the dispersant is one or more independently selected from a group consisting of water, methanol, ethanol, propanol.

10. The method of claim 1, further comprising pressing, wherein the pressing comprises hot-pressing.

11. The method of claim 10, wherein the hot-pressing is performed at a temperature in a range of 120° C. to 180° C., and wherein the hot-pressing is performed at a pressure in a range of 150 bar to 250 bar, and wherein the step of hot-pressing is performed for a period of at most 2 hours.

12. The method of claim 1, further comprising conditioning the bipolar membrane, wherein the conditioning is performed in an aqueous solution of sodium chloride comprising a concentration in a range of 0.5 M to 1.5 M.

13. A bipolar membrane comprising:
a junction layer;
a first cation exchange layer comprising a first water splitting catalyst and a first cation exchange polymer, wherein the first cation exchange layer is assembled adjacent to the junction layer; and
a first anion exchange layer comprising a second water splitting catalyst and a first anion exchange polymer, wherein the first anion exchange layer is assembled adjacent to the junction layer,
wherein at least one of the first cation exchange layer comprises a concentration of the first water splitting catalyst and the first anion exchange layer comprises a concentration of the second water splitting catalyst which varies in a direction extending from the adjacent junction layer.

14. The bipolar membrane of claim 13, further comprising a second cation exchange layer comprising a second cation exchange polymer, wherein the second cation exchange layer is assembled adjacent to at least one of the first cation exchange layer and a second anion exchange layer comprising a second anion exchange polymer, wherein the second anion exchange layer is assembled adjacent to the first anion exchange layer.

15. The bipolar membrane of claim 13, wherein the first water splitting catalyst and the second water splitting catalyst are one or more independently selected from a group consisting of MCM-41, $TiO_2$, $IrO_2$, $Al(OH)_3$, graphene oxide, graphite oxide, ZIF-7, ZIF-8, ZIF-90, MOF-5, IRMOF-1, HKUST-1, CuTPA, $SiO_2$, Mn $(HCOO)_2$.

16. The bipolar membrane of claim 13, wherein the junction layer comprises at least one of a third cation exchange polymer and a third anion exchange polymer.

17. The bipolar membrane of claim 13, wherein each of the first cation exchange polymer and the second cation exchange polymer is at least one of, independently selected from a group consisting of, sulfonated poly-ether ether ketone, a copolymer of poly (tetrafluoroethylene) and polysulfonyl fluoride vinyl ether, sulfonated poly (2,6-dimethyl-1,4-phenylene oxide), sulfonated polyether sulfone, and wherein each anion exchange polymer is one or more independently selected from a group of quaternized poly (p-phenylene oxide), quaternized polyepichlorhydrine, poly (spirobiindane-aryl ether sulfone) copolymers, polyethylene oxide, quaternized polyether sulfone.

* * * * *